April 27, 1943.    C. E. FRUDDEN    2,317,957
POWER TAKE-OFF
Filed May 19, 1939
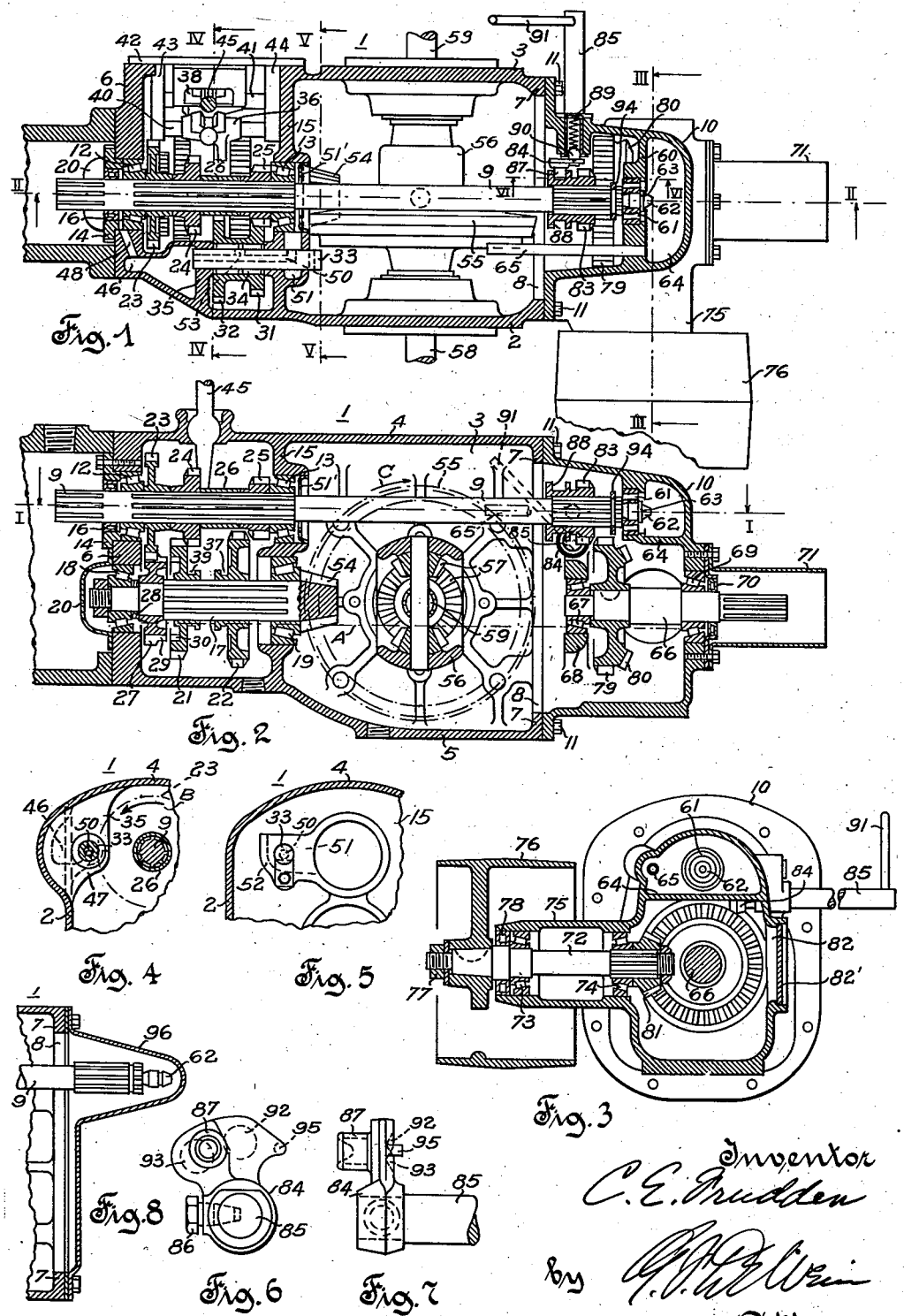
Inventor
C. E. Frudden
by
Attorney Patented Apr. 27, 1943

2,317,957

UNITED STATES PATENT OFFICE 2,317,957

POWER TAKE-OFF

Conrad E. Frudden, Wauwatosa, Wis., assignor to Allis-Chalmers Manufacturing Company, Milwaukee, Wis., a corporation of Delaware Application May 19, 1939, Serial No. 274,519

11 Claims. (Cl. 74—11)

The invention relates to motor vehicles and it is concerned more specifically with an improved mechanism for transmitting power from the vehicle motor to the propelling wheels and to a power take-off for driving external machinery, the mechanism being preferably such that the propelling wheels and the power take-off may be driven from the motor either separately or simultaneously, as desired.

For instance, tractors are commonly used for various operations which require that take-off power be available while the tractor is standing still, and for other operations which require that take-off power be available while the tractor is moving. A belt pulley ordinarily furnishes take-off power, when the tractor is standing still, for driving external machinery such as a pump, a saw or ensilage cutter, and a power take-off shaft, commonly termed an implement drive shaft, ordinarily furnishes take-off power, when the tractor is moving, for driving external machinery, such as a combine or mower which may be hitched to the tractor.

It is an object of the invention to provide an improved power take-off attachment for a tractor, which meets the mentioned requirements for take-off power, that is the requirement for take-off power when the tractor is standing still, and the requirement for take-off power when the tractor is moving.

More specifically it is an object of the invention to provide an attachment of the mentioned character which is constructed as a compact unit, and which may be readily attached to and removed from the tractor. The invention contemplates to provide such a unit which may be furnished as additional equipment, so that the tractor may originally be sold without it, for instance, in cases where the purchaser desires to use the tractor for operations which require no take-off power, such as plowing or cultivating. Should the purchaser later desire to use the tractor for belt work or other operations requiring take-off power he may purchase the power take-off attachment separately and install it on the tractor without difficulty, the attachment being so constructed that its installation on the tractor requires no special tools or shop facilities.

Another object of the invention is to provide an attachment of the mentioned character which, when detached from the tractor, forms a compact unit which may be shipped conveniently in substantially assembled condition without taking up excessive shipping space.

With these objects in view, the invention contemplates a power take-off attachment which comprises a cap housing adapted to be mounted over an opening in the housing structure of the tractor, and which has an internal bearing affording an auxiliary support for a drive shaft permanently mounted on the tractor, the construction being such that the bearing may be removed from the drive shaft when the cap housing is removed from the tractor.

Another object of the invention is to provide a power take-off attachment of the mentioned construction, in which the internal auxiliary bearing is adequately lubricated not only while power is being transmitted to the belt pulley shaft or to the implement drive shaft, but also during periods when the tractor is used for plowing or other operations which require no take-off power, and during which periods the mentioned drive shaft is subject to continuous rotation.

Another object of the invention is to provide a power take-off attachment for tractors, comprising a housing and two power take-off shafts journaled therein, one being an implement drive shaft arranged to extend longitudinally of the tractor and the other being a pulley shaft extending transversely of the implement drive shaft.

More specifically, it is an object of the invention to provide a double power take-off attachment of the mentioned character in which the housing, the power take-off shafts and gearing within the housing for transmitting power from one of said shafts to the other are combined to form a simple and compact unit which may be readily attached to and detached from the tractor.

Another object of the invention is to provide an improved power take-off attachment for tractors, affording a lubricant storage space in addition to and in communication with a lubricant storage space of the tractor, and to distribute part of the lubricant contained within the additional storage space to elements of the attachment which are located above the level to which the storage spaces are normally filled with lubricant.

It is a further object of the invention to provide an improved double power take-off attachment having an implement drive shaft and a pulley shaft and mechanism for transmitting power from a driving shaft on the tractor revolving at engine speed, to the implement drive shaft, which mechanism causes the implement drive shaft to rotate at less than engine speed, and which mechanism preferably causes the pulley shaft to rotate at a higher speed than the implement drive shaft.

These and other objects and advantages of the invention will be apparent from the following description of a preferred embodiment of the invention. Referring to the drawing accompanying and forming part of this specification, and in which like reference characters designate the same or similar parts in the various views:

Fig. 1 is a sectional top view of a drive and power take-off mechanism for a tractor, the section being taken on line I—I of Fig. 2;

Fig. 2 is a sectional side view of the drive and power take-off mechanism shown in Fig. 1, the section being taken on line II—II of Fig. 1;

Fig. 3 is a sectional rear view of the mechanism shown in Figs. 1 and 2, the section being taken on line III—III of Fig. 1;

Fig. 4 is a detail view on line IV—IV of Fig. 1;

Fig. 5 is a detail view on line V—V of Fig. 1;

Figs. 6 and 7 are detail views of a shift finger forming part of the mechanism shown in Figs. 1 and 2, Fig. 6 corresponding to a view on line VI—VI of Fig. 1; and Fig. 8 is a sectional view of a cover for use in connection with part of the mechanism shown in Figs. 1 and 2, the section shown in Fig. 8 being taken on the same plane as the section shown in Fig. 2.

The embodiment of the invention illustrated in the accompanying drawings indicates its incorporation in a tractor of the type having a pair of axially spaced propelling wheels, differential and final drive gearing for driving the propelling wheels, a change speed transmission, a motor, and the usual mechanism including a master clutch for transmitting power from the motor to the drive shaft of the transmission, the driven shaft of the transmission being drivingly connected with the differential gearing. For a full disclosure of a tractor of the mentioned character reference is made to a copending application of C. E. Frudden and W. F. Strehlow, Serial No. 274,164, filed May 17, 1939, Tractor, features of the invention herein disclosed and claimed being also disclosed in said copending application. It should be understood, however, that the invention is not limited to the specific type of tractor disclosed in said copending application, since the invention possesses features which may also be used advantageously in other types of tractors, for instance, in a crawler type tractor in which the drive mechanism for the propelling wheels includes a pair of steering clutches instead of a differential gear.

Referring to Figs. 1 and 2 of the accompanying drawing, a change speed transmission mechanism and a differential gearing are shown enclosed in a housing 1 having side walls 2 and 3, a top wall 4, a bottom wall 5 and a front wall 6; a continuous flange 7 extending inwardly a short length from the side, top and bottom walls of the housing 1 at the rear end thereof, and the inner edge of the flange 7 defining a substantially rectangular large opening 8 at the rear of the housing 1. A drive shaft 9 extends longitudinally through the housing 1, and a forward portion of the shaft 9 beyond the front wall 6, is splined for connection with an engine driven shaft (not shown) which may be a propeller shaft rotating at engine speed. For purposes of definition, the shaft 9 will be referred to hereinbelow as a power driven shaft of the tractor. When the tractor engine is running, this power driven shaft is normally rotating, and the mentioned differential gearing forms part of a rotatable propelling mechanism of the tractor which is enclosed in the housing 1 and which is selectively connectible with and disconnectible from the shaft 9 by the mentioned change speed transmission. The shaft 9 may, therefore, be rotated by the engine irrespective of whether the tractor is moving or standing still, for driving a power takeoff mechanism from said shaft, the latter being provided for that purpose with a rearward extension or associated shaft element which is rotatable about an axis extending through the opening 8 of the housing 1. As shown in Figs. 1 and 2, the rearward portion of the power driven shaft 9 projects a substantial distance rearwardly from the housing 1 through the rear opening 8 into a cap housing 10 which is secured to the housing 1 over the rear opening 8 by means of bolts 11 screwed into the flange 7 of the housing 1, the cap housing 10 extending outwardly from the housing 1 and having an open side conforming to the opening 8 of the housing 1.

The power driven shaft 9 is axially integral and rotatably mounted intermediate its ends within the housing 1 in angularly fixed relation thereto by means of conical roller bearings 12 and 13, the roller bearing 12 being mounted in an opening of the front wall 6 and retained by a bearing retainer 14, and the roller bearing 13 being mounted in an opening of a transverse wall 15 of the housing 1. An oil seal 16 within the bearing retainer 14 prevents the escape of lubricant from the housing 1 through the roller bearing 12. A driven shaft 17 is mounted in the front wall 6 and in the transverse wall 15 directly below the drive shaft 9 by means of roller bearings 18 and 19, a cap 20 being secured to the front wall 6 in front of the roller bearing 18 to prevent the escape of lubricant from the housing 1 through the roller bearing 18. The driven shaft 17 forms the variable speed shaft of the change speed transmission enclosed within the forward portion of the housing 1, and the shaft 9 forms the drive shaft of said transmission. The change speed mechanism is of the shiftable gear type and includes shifting gears 21 and 22 on the driven shaft 17, and non-shiftable gears 23, 24 and 25 on the drive shaft 9. The hubs of the gears 21 and 22 have internal splines engaging splines of the driven shaft 17 to secure the gears non-rotatably but shiftably to the driven shaft 17, and the non-shiftable gears 23, 24 and 25 likewise have internally splined hubs engaging splines of the drive shaft 9 to secure the gears non-rotatably to the drive shaft 9. A spacer 26 between the gears 24 and 25 on the drive shaft 9 prevents axial displacement of the gears on the drive shaft, the end gears 23 and 25 being seated against the inner races of the roller bearings 12 and 13, respectively. The driven shaft 17 has a forward portion of reduced diameter rearwardly of the roller bearing 18 on which a gear 27 is freely rotatable, the gear being prevented from axial displacement on the driven shaft 17 by contact with a spacer 28 seated against the inner race of the roller bearing 18 and by contact with a shoulder at the forward ends of the splines of the driven shaft 17. The gear 23 is in constant mesh with circumferential teeth of the gear 27, the width of the teeth on the gear 27, however, being about twice the width of the teeth on gear 23. The external diameter of gear 27 is somewhat reduced at the side thereof facing the gear 21, and the gear 21 has internal teeth 30 which may be clutchingly engaged with the reduced portion of the gear 27 by axial forward shifting movement of the gear 21. An integrally formed double gear having gear sections 31 and 32 is rotatably mounted on a shaft 33 by means of rollers 34, as shown in Fig. 1, the shaft 33 being supported at its rearward end in the transverse wall 15 of the housing 1, and at its forward end in a wall portion 35 extending inwardly from the side wall 2 of the housing 1. The gear section 31 of the double gear is in constant mesh with the gear 25 on the power driven shaft 9, and the gear section 32 is adapted to be meshingly engaged with the shiftable gear 22 by axial movement of the gear 22 forwardly in the direction towards gear 21 from the position in which gear 22 is shown in Fig. 2.

For first speed forward the shiftable gear 22 is moved into mesh with the low speed gear 25 on the shaft 9. For second speed forward the shiftable gear 21 is moved into mesh with the second speed gear 24 on the shaft 9; and for third speed forward the shiftable gear 21 is moved into clutching engagement with the gear 27. For reverse speed the shiftable gear 22 is moved into mesh with the gear section 32 of the double gear mounted on shaft 33. The mechanism for accomplishing the mentioned shifting movements of the gears 21 and 22 comprises a shifting fork 36 in engagement with a collar 37 of the shiftable gear 22 and a shifting fork 38 in engagement with a collar 39 of the shiftable gear 21. The shifting forks 36 and 38 are slidably mounted on shafts 40 and 41, respectively, which are supported on a frame comprising a plate 42 and arms 43 and 44 secured to the plate 42. The supporting frame for the shafts 40 and 41 is mounted in a side opening of the housing 1, the plate 42 forming a cover for said side opening. A gear shift lever 45 is universally mounted in the top wall 4 of the housing 1 as shown in Fig. 2 and selectively engageable with the forks 36 and 38 in the usual manner.

The wall portion 35 in which the forward end of the shaft 33 for the double gear 31, 32 is mounted forms part of a pocket 46 within the housing 1, the pocket 46 having a wall 47 extending forwardly from the wall portion 35 and merging with the side wall 2 and the front wall 6 of the housing 1 as shown in Figs. 1 and 4. The wall 47 of the pocket 46 extends upwardly to a horizontal plane through the axis of the shaft 9 and is suitably recessed in the vicinity of the gear 23 as shown in Fig. 1.

In operation, the interior of the housing 1 is filled with lubricant to a normal level indicated by the dash dotted line A in Fig. 2, the rear opening 8 of the housing 1, which extends above and below said normal lubricant level being closed by the cap housing 10, as shown in Fig. 2, or as an alternative, by a cover 96 as shown in Fig. 8, in order to permit storage of lubricant in the housing 1 at said normal level. The gear 23 is in constant mesh with the gear 27, and the lower part of the gear 27 will continuously sweep through the body of lubricant in the housing 1 while the shaft 9 is being rotated. A certain amount of lubricant adhering to the teeth of the gear 27 will be raised by the gear 27 and picked up by the gear 23, which latter gear rotates in the direction of the arrow B indicated in Fig. 4. The centrifugal force acting upon the lubricant on gear 23 will throw said lubricant against the side wall 2 and the top wall 4 of the housing 1 above the pocket 46, and from said walls the lubricant will run down into the pocket 46. The pocket 46 will therefore be supplied with a continuous stream of lubricant while the shaft 9 is rotating. A bore 48 in the front wall 6 of the housing 1 connects the pocket 46 with the opening in which the roller bearing 12 is mounted and, as may be seen from Fig. 1, some of the lubricant in pocket 46 may flow through the bore 48 and pass through a cut-out of retainer 14 into a space rearwardly of the seal 16 and in front of the roller bearing 12. This roller bearing will be, therefore, continuously supplied with an adequate amount of lubricant while the shaft 9 is rotating.

Another part of the lubricant scooped into the pocket 46 may flow through a bore 50 in the shaft 33 into a pocket 51 formed on the rear face of the transverse wall 15 as shown in Figs. 1 and 5. The pocket 51 is formed by a wall portion 52 merging with the transverse wall 15, and the pocket 51 communicates with the opening in the transverse wall 15 in which the roller bearing 13 of the drive shaft 9 is mounted. A baffle washer 51' is press-fitted into the opening of the transverse wall 15 in which the roller bearing 13 is mounted, the baffle washer being spaced rearwardly from the roller bearing 13 to permit lubricant flowing from the pocket 51 to enter the space between the roller bearing 13 and the baffle washer 51'. The inner circular edge of the baffle washer is spaced peripherally from the shaft 9, and while there will be a continuous flow of lubricant through the annular space between the baffle washer 51' and the shaft 9, a certain amount of lubricant will also pass between the inner and outer races of the roller bearing 13 and keep this roller bearing properly lubricated. Suitably located holes in the transverse wall 15 permit equalization of the lubricant level A forwardly and rearwardly of said wall.

It should be noted that the outer races of the roller bearings 12 and 13 are conical and therefore incapable of retaining a limited amount of lubricant like the concave face of the outer race of a ball bearing, and that the lubrication requirements of these roller bearings are therefore much more stringent than those of a ball bearing. The lubricating system described hereinbefore provides for an adequate supply of lubricant to the roller bearings 12 and 13 at all times while the shaft 9 is turning, irrespective of whether the transmission is set for any one of the three mentioned forward speeds or for reverse speed, or whether it is in neutral. The supply of lubricant to the bearings 12 and 13 is fully automatic, and there will be no danger of these roller bearings running dry due to lack of attention.

In order to supply the rollers 34 carrying the double gear 31 and 32 with lubricant, the bore 50 has a radial branch 53 through which part of the lubricant passing through the bore 50 may escape in order to keep the rollers 34 lubricated.

A bevel pinion 54 is integrally formed with the driven shaft 17 at the rear end of the latter meshes and the propelling mechanism of the tractor which, as stated, is enclosed in the rearward portion of the housing 1 includes a bevel ring gear 55 which meshes with the pinion 54. Secured to the ring gear 55 is the mentioned differential gearing which is of conventional construction and includes the usual pinion cage 56 which has oppositely extending arms journaled in the side walls 2 and 3 of the housing 1, the cage supporting a nest of bevel gears 57 through which power is transmitted to the differential shafts 58 and 59. In operation, the shaft 9 rotates in the direction of arrow B in Fig. 4, as stated, and when the transmission is set for any one of the three mentioned forward speeds, the ring gear 55 will rotate in the direction of arrow C in Fig. 2, the ring gear 55 being indicated in dash dotted lines in this figure because it is offset towards the near side of the shafts 9 and 17 in Fig. 2. The differential shafts 58 and 59 carry final drive pinions on their outer ends (not shown) which mesh with final drive gears secured to the propelling wheels of the tractor, as usual; and rotation of the ring gear 55 in the direction of arrow C in Fig. 2 will therefore cause forward movement of the tractor.

The bevel ring gear 55 of the differential forms a driving gear of the propelling mechanism of the tractor, and it is mounted, within the hollow support afforded by the housing 1, for rotation about a transverse horizontal axis. The driven shaft 17 which is drivingly connected with the ring gear 55 constitutes a countershaft which extends forwardly from the ring gear 55 within the hollow support or housing 1 on a longitudinal horizontal axis. The conical roller bearings 12 and 13 serve as a pair of axially spaced transmission bearings which are mounted within the housing 1 laterally of the countershaft 17 in advance of the driving gear 55 and remote from the rearward aperture 8 of the housing 1. As stated hereinbefore, the bearings 12 and 13 retain the drive shaft 9 in angularly fixed relation to the housing 1, and they are capable of adequately supporting the drive shaft 9 when power is being transmitted therethrough to the propelling wheels of the tractor and when the tractor is equipped with a rear cover 96 as shown in Fig. 8, in which case the relatively long rearwardly overhanging portion of the drive shaft 9 is not engaged by any additional bearing or support.

The cap housing 10 which is secured over the opening 8 to the rear end of the housing 1, has an internal transverse wall 60 in its upper portion, and an auxiliary roller bearing 61 is mounted in a bore of said transverse wall 60. As shown in Figs. 1 and 2, the auxiliary bearing 61 is mounted on the cap housing 10 in such a position that when the cap housing is secured to the casing 1 of the tractor the bearing 61 will support the shaft 9 at a rearward portion of the latter for rotation about the common axis of the bearings 12 and 13, that is, for rotation about an axis extending through the casing opening 8 above the normal lubricant level A. The shaft 9 has at its rear end a portion of reduced diameter journaled in the bearing 61, and a cone shaped portion 62 at said rear end projects rearwardly from the roller bearing 61. The transverse wall 60 merges with the side walls of the cap housing 10 and forms part of a chamber within the cap housing for the accumulation of lubricant above the normal lubricant level indicated by the dash-dotted line A in Fig. 2, the bottom of said lubricant chamber being formed by a horizontal wall portion 64 which merges with the wall portion 60 and with the side and rear walls of the cap housing 10. A tube 65, open at its front and rear ends, is press-fitted into an opening of the wall 60 laterally of the roller bearing 61 and extends forwardly from the cap housing 10 into the rear portion of the housing 1. As shown in Figs. 1 and 2, the tube 65 extends at the side of the upper part of the ring gear 55, only a portion of the tube being indicated in dash dotted lines in Fig. 2 because the tube is offset towards the near side of shaft 9 in said figure. The interior of the housing 1 and cap housing 10 is filled with lubricant to the level indicated by line 75

A in Fig. 2, as stated, and when the ring gear 55 rotates in the direction of arrow C, some of the lubricant within the housing 1 will adhere to the ring gear 55 and will be carried upwardly therewith. The forward open end of the tube 65 is positioned closely to the periphery of the ring gear 55, and lubricant adhering to the ring gear will be pushed into the tube as the ring gear 55 rotates in the direction of arrow C. When the tractor is progressing, the lubricant chamber rearwardly of the roller bearing 61 will therefore be filled with lubricant. Since the opening for the roller bearing 61 is in communication with the interior of the lubricant chamber formed by the walls 60 and 64, the lubricant accumulating in said chamber will have access to the rollers of the roller bearing 61.

An implement drive shaft 66, or first power take-off shaft, is mounted in the cap housing 10 for rotation about an axis extending parallel to the axis of the power driven shaft 9, the shaft 66 being radially spaced or offset from the axis of the shaft 9 and extending transversely of the plane of the opening 8 of the hollow support formed by the rear housing structure 1 of the tractor. The forward end of the implement drive shaft 66 is supported in a roller bearing 67 mounted in a transverse bridge portion 68 of the cap housing 10, and a roller bearing 69 mounted in the rear wall of the cap housing 10 supports the implement drive shaft 66 intermediate its ends, the rear end of the implement drive shaft projecting outwardly from the cap housing 10 and being splined for connection with a coupling element for driving external machinery. An oil seal 70 around the implement drive shaft 66 prevents the escape of lubricant from the cap housing 10 through the opening in which the roller bearing 69 is mounted, and a protecting sleeve 71 surrounding the outer end of the implement drive shaft is detachably secured to the cap housing. In addition to the implement drive shaft 66 a pulley shaft 72, or second power take-off shaft, is mounted in the cap housing 10, the pulley shaft extending at right angles to the implement drive shaft and being journaled in roller bearings 73 and 74 mounted in a laterally extending arm 75 of the cap housing 10. The pulley shaft 72 carries a belt pulley 76 which is detachably secured to the outer end of the pulley shaft projecting from the arm 75 by means of a nut 77, the hub of the belt pulley being seated on a conical portion of the shaft 72 and keyed to the shaft in the usual manner. A seal 78 in the arm 75 prevents the escape of lubricant from the cap housing 10 along the pulley shaft 72.

A single piece double gear having circumferential spur teeth 79 and lateral bevel teeth 80 is keyed on the implement drive shaft 66 adjacent to the bridge portion 68, and the pulley shaft 72 has a bevel pinion 81 secured to its inner end in mesh with the bevel teeth 80 of the double gear 79, 80. The side wall of the cap housing 10 opposite to the pulley shaft 72 has an opening 82 indicated in Fig. 3, which is normally closed by a cover 82', the opening 82 being provided for convenience in machining the interior of the arm 75.

Slidably mounted on a splined portion of the power driven shaft 9 within the cap housing 10 is a pinion 83 which may be moved into and out of mesh with the spur teeth 79 of the double gear 79, 80 the pinion 83 and spur gear section 79 forming a selectively engageable and disengageable power transmitting connection between the shaft 9 and the first power take-off shaft 66. The second power take-off shaft 72 is permanently geared to the first power take-off shaft 66, as stated, and movement of the pinion 83 into and out of mesh with the spur gear section 79 causes not only the first power take-off shaft 66 but also the second power take-off shaft 72 to be connected with and disconnected from the power driven shaft 9. The mechanism for shifting the pinion 83 comprises a shift finger 84 shown in detail in Figs. 6 and 7, which is secured to a rock shaft 85 journaled in the side wall of the cap housing 10. The shift finger is secured to the inner end of the rock shaft 85 by means of a set screw 86 and carries a roller 87 which engages a groove of a shift collar 88 integrally formed with the pinion 83. The wall of the cap housing on which the rock shaft 85 is mounted has a cylindrical recess above the rock shaft in which a spring 89 is seated, the spring bearing against a ball 90 contacting the shift finger 84 at the side thereof remote from the roller 87. Rocking of the rock shaft 85 by means of a handle 91 secured to its outer end causes shifting movement of the pinion 83 into and out of mesh with the spur teeth 79 of the double gear 79, 80, the pinion being shown out of mesh with the double gear in Figs. 1 and 2. In this position of the pinion the ball 90 engages a conical recess 92 of the shift finger 84, and due to the action of spring 89 the shift finger is resiliently locked in position to hold the pinion 83 out of mesh with the double gear 79, 80. Another conical recess 93 similar to the recess 92 is formed in the shift finger 84 and cooperates with the ball 90 when the pinion is moved into mesh with the double gear 79, 80, to resiliently lock the pinion in its meshed position. A spring ring 94 is mounted in a groove at the rear end of the splined portion of the drive shaft 9 to limit backward movement of the pinion 83, and a stop 95 is formed on the shift finger for engagement with the cap housing 10 in order to limit forward movement of the pinion 83.

In order to drive the power take-off shafts, the pinion 83 is moved into mesh with the spur teeth of the double gear 79, 80, and since the pinion 83 is of much smaller diameter than the spur gear section of the double gear 79, 80 the implement drive shaft 66 will be rotated at a lower speed than that at which the shaft 9 is rotating, the latter shaft, as stated, preferably rotating at engine speed. The engine speed is usually too high for driving various implements desired to be operated in connection with the tractor, and the gear reduction between the pinion 83 and double gear 79, 80 affords a suitably low speed of the implement drive shaft as is desired in connection with various implements to be coupled with said shaft, for instance, a harvester thresher. Rotation of the double gear 79, 80 by the pinion 83 causes the spur and bevel teeth of this gear to sweep through the lubricant which is stored within the lower part of the cap housing 10 at the normal lubricant level A.

The speed of the belt pulley is ordinarily required to be higher than the speed of the implement drive shaft and such higher speed of the belt pulley is afforded by the gear ratio between the bevel gear section 80 and the bevel pinion 81, the latter having a considerably smaller number of teeth than the bevel gear section of the double gear 79, 80. The gear ratio between the pinion 83 and double gear 79, 80, and the gear ratio between the double gear 79, 80 and the pulley pinion 81 is preferably such that the belt pulley will rotate at a somewhat lower speed than the drive shaft 9.

It should be noted that the point of mesh between the pinion 83 and the double gear 79, 80 is approximately on the same level as the lower part of the roller bearing 61, and since the roller bearing is only slightly spaced rearwardly from the spur gear section 79 of the double gear 79, 80, some of the lubricant elevated by the double gear 79, 80, and diffused laterally at the point of mesh of the pinion 83 and double gear 79, 80, will reach the roller bearing 61 and keep this bearing properly lubricated while the tractor is standing still and its engine power is used for belt work, such as threshing or silo filling. In other words, the selectively engageable and disengageable power transmitting connection between the power driven shaft 9 and the power take-off shafts 66 and 72 functions, when engaged, to supply the auxiliary bearing 61 with lubricant from the lower portion of the cap housing 10, but it is incapable of so functioning when disengaged. The power driven shaft 9 is normally rotating when the tractor engine is running, as stated, and the described lubricant transfer from the casing 1 to the upper lubricant chamber in the cap housing 10 prevents the bearing 61 from running dry when the propelling mechanism of the tractor including the gear wheel 55 is connected with the shaft 9 through the change speed transmission and when the power transmitting connection between the shaft 9 and the power take-off shafts 66 and 72 is disengaged due to disengagement of the pinion 83 from the spur gear section 79.

The cap housing 10 with the two power take-off shafts mounted thereon, together with the double gear 79, 80 and the bevel pinion 81 and the shift mechanism for the pinion 83, forms a compact unit which may be readily attached to and detached from the housing 1 while the drive shaft 9 remains in the position in which it is shown in Figs. 1 and 2. The rear of the shaft 9 is journaled in the bearing 61 as stated, the journal connection permitting axial or telescopic separation of the shaft and bearing from each other. The inner race of the roller bearing 61 is retained on the shaft 9 by a spring ring 63 seated in a groove forwardly of the cone 62, the groove being more clearly shown in Fig. 8. The rollers of the bearing 61 are mounted in a cage which is axially retained on the outer race of the bearing, and when the bearing 61 and shaft 9 are separated, the inner race may be withdrawn together with the shaft 9, while the outer race, rollers and roller cage remain within the cap housing 10.

In order to remove the double power take-off unit from the tractor, the bolts 11 which secure the cap housing 10 to the housing 1 are unscrewed. The power take-off unit may then be moved rearwardly away from the housing 1 to telescopically disengage the outer race and rollers of bearing 61 from the inner race which remains on the drive shaft 9, and thereafter the unit may be moved transversely of the drive shaft 9 to disengage the roller 87 of the shift finger 84 from the groove of the shift collar 88 of the pinion 83, the latter remaining in place on the splined rearward portion of the drive shaft 9. If desired, the pinion 83 and the inner race of the roller bearing 61 may be withdrawn from the drive shaft 9 after removal of the spring rings 94 and 63, and the opening 8 of the housing 1 may be closed by the cover 96 as indicated in Fig. 8. On the other hand, the double power take-off unit may be readily attached to a tractor which was originally furnished with the cover 96 as shown in Fig. 8. After removal of the cover, the pinion 83 and the inner race of the roller bearing 61 are slipped upon the rear portion of the drive shaft 9, and the spring rings 94 and 63 are installed. The cap housing 10 with the other parts shown in Figs. 1 and 2 mounted thereon is then moved into position for connection with the housing 1 by means of the bolts 11. While moving the cap housing into the said position the roller 87 of the shift finger 84 is first engaged with the groove 88 of the pinion 83 and the rollers and outer race of bearing 61 are then axially moved upon the inner race on the end of the drive shaft 9, such manipulation being facilitated by the conical rearward projection of the drive shaft 9.

It will be seen that power may be transmitted to the implement drive shaft 66 and to the belt pulley shaft 72, irrespective of whether the tractor is standing still or in motion. When the engine of the tractor is running and take-off power is desired for belt work while the tractor is standing still, the change speed transmission is put in neutral, as shown in Fig. 2, and the pinion 83 is moved into mesh with the gear 79. On the other hand, if take-off power is desired while the tractor is moving, for instance, for driving the cutting and threshing mechanism of a combine which is hitched to the tractor, the change speed transmission may be shifted into any one of the mentioned gear combinations, and power may be transmitted to the implement drive shaft and to the belt pulley shaft in the same manner as when the tractor is standing still, namely, by shifting the gear 83 into mesh with the power take-off gear 79.

When the tractor is used for plowing or other operations which require no take-off power, the auxiliary bearing 61 is prevented from running dry by the described transfer of lubricant from the housing 1 into the chamber in rear of the auxiliary bearing 61 through the tube 65. Such lubricant transfer, however, only takes place while the tractor is moving, and during belt work, when the tractor is standing still, the auxiliary bearing 61 is lubricated by diffusion of lubricant at the point of mesh of the gears 79 and 83, as has also been mentioned hereinbefore.

The drive shaft 9 is rigid from end to end, and, as shown in the drawing, it has a fixed axial length which is somewhat greater than the combined spacings between the transmission and auxiliary bearings 12, 13 and 61. In other words, the spacing between the transmission bearings 12 and 13 plus the spacing between the transmission bearing 13 and the auxiliary bearing 61 is somewhat less than the axial length of the drive shaft 9. In order to support the drive shaft 9 in the three bearings, its length should obviously be not less than the combined axial spacings between the bearings.

It should further be noted that the drive shaft 9 is retained against axial displacement by the conical roller bearings 12 and 13, and that it is permanently mounted on the tractor as distinguished from the power take-off attachment which, as indicated hereinbefore, may be mounted on the tractor in place of the sheet metal cover 96 shown in Fig. 8. The tractor may be purchased originally without the power take-off attachment, in which case it may be supplied with the rear aperture 8 and the rear end of the drive shaft 9 covered by the cover 96, as shown in Fig. 8.

Should the purchaser later desire to use the tractor for belt work or other operations requiring take-off power, he may purchase the power take-off attachment separately and install it on the tractor in a simple manner as has been described hereinbefore.

The position in which the drive shaft 9 is permanently held by the bearings 12 and 13 is such that its rear end projects beyond the rear end of the housing 1. This is a desirable arrangement because it affords a compact design of the power take-off unit which, when removed from the tractor, has no driving part projecting beyond the open side of the cap housing 10. When detached, the power take-off unit therefore forms a compact assembly which may be shipped conveniently in substantially assembled condition without taking up excessive shipping space.

It should also be noted that there is no sleeve coupling or similar slidable connection between the portion of the drive shaft 9 which carries the pinion 83 and the portion of said shaft which is mounted in the bearings 12 and 13. In other words, the disclosed construction avoids a sleeve coupling in the drive shaft for the power take-off mechanism, which sleeve coupling has heretofore been common in power take-off mechanism for tractors, and which has complicated the design and added to the manufacturing costs of such earlier power take-off mechanisms.

While in the foregoing a preferred embodiment of the invention has been shown and described, it should be understood that it is not intended to limit the invention to the details of construction herein shown and described for various modifications within the scope of the claims may occur to persons skilled in the art.

It is claimed and desired to secure by Letters Patent:

1. A double power take-off attachment for a tractor having a power driven shaft projecting through an opening in its rear housing structure and a pinion mounted on said shaft, said power take-off attachment comprising a cap housing having an open side adapted to be secured to said housing structure over said opening thereof; an implement drive shaft journaled in said cap housing below the axis of said power driven shaft and extending through a wall portion of said cap housing opposite to said open side thereof; a pulley shaft mounted on said cap housing for rotation about an axis extending transversely of the axis of said implement drive shaft; gearing within said cap housing drivingly connecting said implement drive shaft with said pulley shaft; a spur gear adapted to mesh with said pinion, secured to said implement drive shaft within said cap housing; and a bearing for said power driven shaft, within said cap housing in proximity to the periphery of said spur gear; whereby lubricant retained within said rear housing structure by said cap housing and elevated by said spur gear will become effective to lubricate said bearing.

2. In a motor vehicle, a hollow support, a driving gear rotatable within said support about a transverse horizontal axis, a countershaft drivingly connected with said driving gear and extending forwardly therefrom within said support on a longitudinal horizontal axis, a pair of axially spaced transmission bearings mounted within said support laterally of said countershaft and in advance of said driving gear, a cap housing detachably secured to said support over an aperture of the latter at the rear of said driving gear and having an auxiliary bearing in rear of said aperture, an axially integral power driven shaft of a length not less than the combined axial spacings between said transmission and auxiliary bearings, said power driven shaft being permanently mounted on said vehicle within said transmission bearings and being additionally supported in said auxiliary bearing for rotation on the axis of said transmission bearings, change speed gearing operable by said power driven shaft to rotate said countershaft, a power take-off shaft rotatably mounted on said cap housing, and power transmitting means including a gear mounted on a portion of said power driven shaft forwardly of and in proximity to said auxiliary bearing, operable by said power driven shaft to rotate said power take-off shaft, said power transmitting means being separable and said auxiliary bearing being detachable from said power driven shaft, whereby said cap housing, power take-off shaft and auxiliary bearing may be removed from said support without removing said power driven shaft therefrom.

3. In a motor vehicle, a hollow support having an end aperture and a pair of relatively spaced transmission bearings therein remote from said end aperture and alined on a horizontal axis extending through said end aperture, a cap housing detachably secured to said support over said end aperture thereof and having a portion extending outwardly from said support, an auxiliary bearing mounted on said cap housing in alinement with said axis and in axially spaced relation to said transmission bearings, a rigid power driven shaft of a fixed axial length not less than the combined axial spacings between said transmission and auxiliary bearings, said power driven shaft being permanently mounted on said vehicle within said transmission bearings and being additionally supported on said auxiliary bearing for rotation on said horizontal axis, propelling means including gearing within said support drivingly connected with said power driven shaft, a first power take-off shaft mounted on said cap housing for rotation about an axis radially spaced from the axis of said power driven shaft and extending substantially parallel therewith, a second power take-off shaft mounted in said outwardly extending portion of said cap housing for rotation about an axis extending transversely of the axis of said first power take-off shaft, gearing within said cap housing drivingly connecting said first with said second power take-off shaft, and means for transmitting power from said power driven shaft to said first power take-off shaft, said power transmitting means being separable and said auxiliary bearing being detachable from said power driven shaft, whereby said cap housing, power take-off shafts and bearing may be removed from said support without removing said power driven shaft therefrom.

4. A power take-off attachment for a tractor having an opening in the rear housing structure thereof, a power driven shaft having an integral end portion outside of said housing structure and bearing means within said housing structure normally supporting said shaft, at a portion thereof remote from said opening, for rotation about an axis extending through said opening, said power take-off attachment comprising a cap housing adapted to be secured to said housing structure in a position to cover said opening thereof, an auxiliary bearing element mounted within said cap housing for axial alinement with said bearing means of said housing structure and movable, by movement of said cap housing, into and out of rotary supporting engagement with a complementary bearing element on said integral end portion of said shaft, a first power take-off shaft mounted on said cap housing for rotation about an axis radially offset from the axis of said auxiliary bearing element, means within said cap housing engageable by a driving element on said power driven shaft for transmitting power from the latter to said first power take-off shaft, a second power take-off shaft mounted on said cap housing for rotation about an axis radially offset from the axis of said auxiliary bearing element, and power transmitting means within said cap housing drivingly connecting said first with said second power take-off shaft.

5. A power take-off attachment for a tractor having an opening in the rear housing structure thereof, a power driven shaft having an integral end portion outside of said housing structure and bearing means within said housing structure normally supporting said shaft, at a portion thereof remote from said opening, for rotation about an axis extending through said opening, said power take-off attachment comprising a cap housing adapted to be secured to said housing structure in a position to cover said opening thereof, an auxiliary bearing element mounted within said cap housing for axial alinement with said bearing means of said housing structure and movable, by movement of said cap housing, into and out of rotary supporting engagement with a complementary bearing element on said integral end portion of said shaft, a first power take-off shaft mounted on said cap housing for rotation about an axis radially offset from and extending parallel to the axis of said auxiliary bearing element, a gear wheel mounted on said first power take-off shaft within said cap housing in a plane at the side of said auxiliary bearing element which, in said covering position of said cap housing, faces towards said housing structure of said tractor, said gear wheel being adapted to cooperate with a pinion on said integral end portion of said power driven shaft, a second power take-off shaft mounted on said cap housing for rotation about an axis extending transversely of the axis of said first power take-off shaft at the side of said plane facing said auxiliary bearing element, and a bevel gear connection between said first and second power take-off shafts.

6. A power take-off attachment as set forth in claim 5, in which said gear wheel has a bevel gear section at the side thereof facing the axis of said second power take-off shaft, and in which said second power take-off shaft has a bevel gear adapted to mesh with said bevel gear section of said gear wheel.

7. A double power take-off unit for a tractor having an opening in the rear housing structure thereof and a power driven element rotatable on a horizontal axis extending through said opening, said power take-off unit comprising a cap housing adapted to be secured to said housing structure over said opening thereof, a first power take-off shaft mounted in said cap housing for rotation about an axis extending parallel to the axis of said power driven element, a second power take-off shaft mounted in said cap housing for rotation about an axis extending outside of said rear housing structure of said tractor transversely of the axis of said first power take-off shaft, gearing within said cap housing drivingly connecting one of said power take-off shafts with the other, and a gear secured to said first mentioned power take-off shaft adapted to mesh with a gear on said power driven element of said tractor.

8. In a motor vehicle, a gear casing, change speed and differential gear mechanisms mounted in forward and rearward compartments, respectively, of said gear casing, said change speed mechanism comprising a variable speed shaft drivingly connected with said differential gear mechanism and a power driven shaft having a forward portion mounted in axially spaced bearings of said forward compartment for rotation about an axis extending through said rearward compartment, and a rearward portion supportingly connected with said forward portion for rotation therewith about said axis, a first power take-off gear mounted on said rearward portion of said power driven shaft, a cap member detachably secured to said gear casing having a rotary supporting connection with said rearward portion of said power driven shaft in rear of said first power take-off gear, said rotary supporting connection being separable axially of said power driven shaft and permitting removal of said cap member from said gear casing without removal of said first power take-off gear from said rearward portion of said power driven shaft, a power take-off shaft journaled on said cap member, and a driving connection between said first power take-off gear and said power take-off shaft including a second power take-off gear mounted on said cap member and adapted to mesh with said first power take-off gear, one of said power take-off gears being disengageable from the other to permit removal of said cap member together with said power take-off shaft and said second power take-off gear as a unit from said gear casing while said power driven shaft and said first power take-off gear remain on said gear casing 9. In a motor vehicle, a gear casing comprising a transmission compartment and a differential compartment in rear of said transmission compartment, a power driven shaft having a forward portion mounted in axially spaced bearings of said transmission compartment for rotation about an axis extending through said differential compartment, and a rearward portion supportingly connected with said forward portion for rotation therewith about said axis, a pinion non-rotatably mounted on said rearward portion of said power driven shaft for shifting movement axially thereof, a cap member detachably secured to said gear casing having a rotary supporting connection with said rearward portion of said power driven shaft in rear of said pinion, said rotary supporting connection being separable axially of said power driven shaft and permitting removal of said cap member from said gear casing without removal of said pinion from said rearward portion of said power driven shaft, a power take-off shaft journaled on said cap member, a gear mounted on said power take-off shaft adapted to be meshed with and demeshed from said pinion by said axial shifting movement of the latter, and a shift element movably mounted on said cap member and engaging said pinion for shifting the latter by operation of said shift element, said shift element being disengageable from said pinion to permit removal of said cap member together with said power take-off shaft, gear and shift element as a unit from said gear casing while said power driven shaft and pinion remain on said gear casing.

10. A double power take-off attachment for a tractor having an opening in the rear housing structure thereof, comprising a cap housing adapted to be secured to said housing structure over said opening thereof, a bearing mounted in said cap housing adapted to support a power driven shaft element for rotation about a first axis extending through said opening, a first power take-off shaft mounted on said cap housing for rotation about an axis spaced from said first axis and extending transversely of the plane of said opening, a second power take-off shaft mounted on said cap housing for rotation about an axis extending outside of said rear housing structure transversely of said first power take-off shaft, and gearing operable by said shaft element and drivingly connected with said first and second power take-off shafts for transmitting rotation of said shaft element at one speed ratio to said first power take-off shaft and at a different speed ratio to said second power take-off shaft.

11. A power take-off attachment for a tractor having a gear casing and a cover detachably secured thereto over an opening thereof for retaining lubricant within said casing at a normal level, said power take-off attachment comprising a cap housing adapted to be secured over said opening, in lieu of said cover, in an outwardly projecting position to permit storage of lubricant within said casing and within a lower portion of said cap housing at said normal level, a first and a second power take-off shaft rotatably mounted on said cap housing, gearing within said cap housing drivingly connecting said shafts with each other including a gear element adapted to sweep through said lubricant stored within said lower portion of said cap housing, a bearing within said cap housing adapted to support a rotary element drivingly connected with the tractor source of power and rotatable on an axis above said normal lubricant level, a pinion rotatable by said rotary element about said axis, and another gear element secured to one of said shafts adapted to sweep through said lubricant stored within said lower portion of said cap housing and to mesh with said pinion at a point in proximity to said bearing, whereby lubricant elevated by said other gear element will become effective to lubricate said bearing.

CONRAD E. FRUDDEN.